June 20, 1967  L. A. KOLZE  3,326,510
ZONE VALVE
Filed Sept. 17, 1963  3 Sheets-Sheet 1

INVENTOR.
Lawrence A. Kolze
BY
ATTORNEYS

June 20, 1967  L. A. KOLZE  3,326,510
ZONE VALVE
Filed Sept. 17, 1963  3 Sheets-Sheet 2
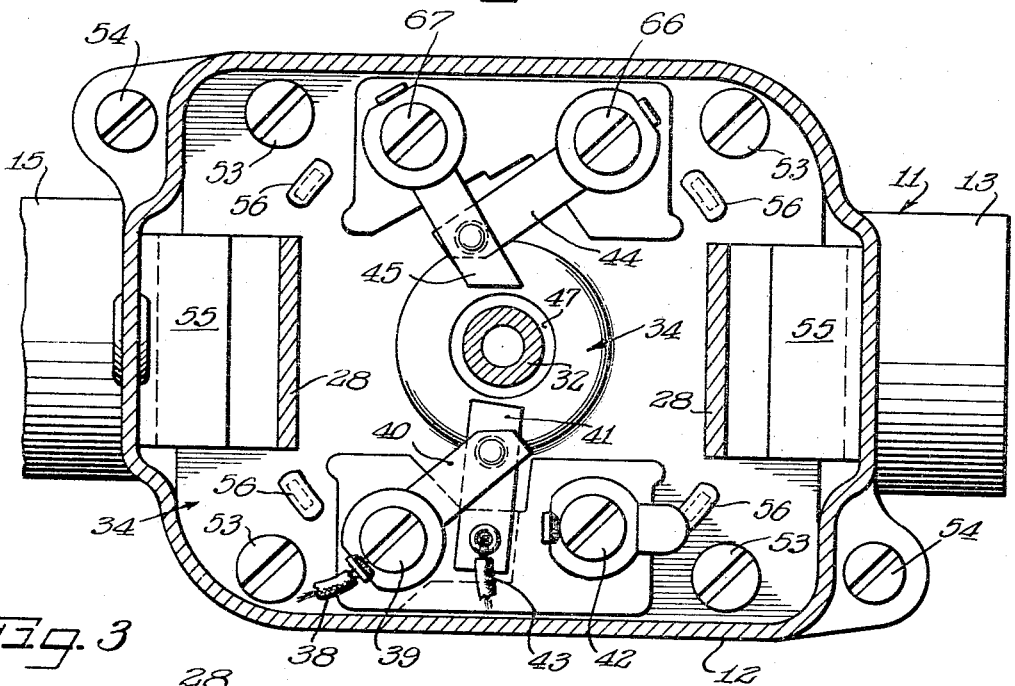
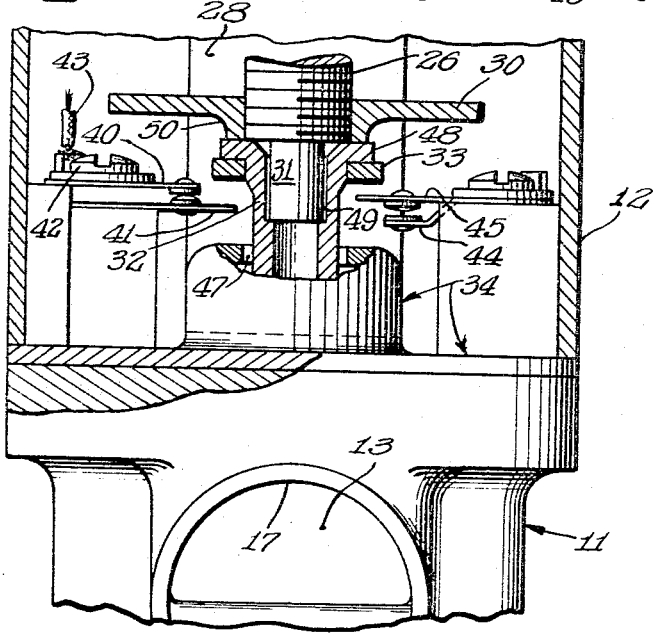
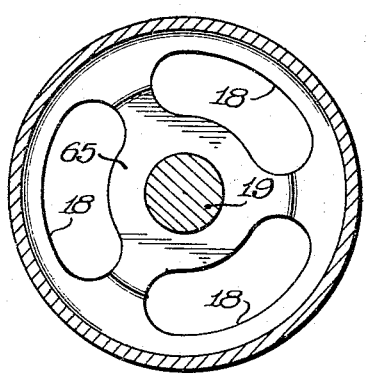
INVENTOR.
Lawrence A. Kolze
BY
ATTORNEYS

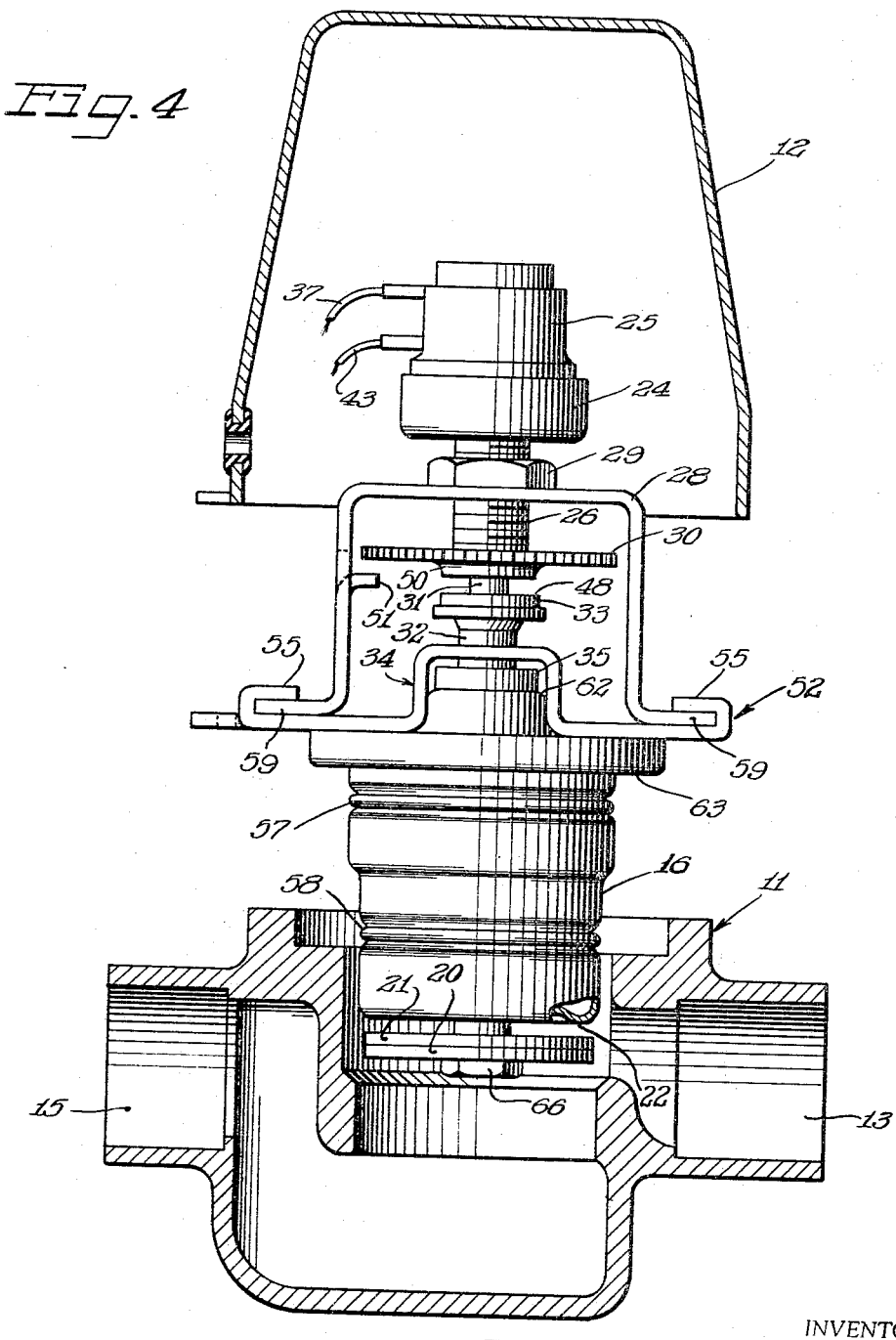

United States Patent Office 3,326,510
Patented June 20, 1967

3,326,510
ZONE VALVE
Lawrence A. Kolze, Bensenville, Ill., assignor to The Dole Valve Company, Morton Grove, Ill., a corporation of Illinois
Filed Sept. 17, 1963, Ser. No. 309,483
6 Claims. (Cl. 251—11)

This invention relates to fluid control valves, and particularly to a fluid control valve of the type which is operable by changes in temperature. More particularly, the invention relates to a fluid control valve employing a thermally sensitive element to provide the motive power to operate the valve.

Valves which can be operated automatically as a function of temperature in a zone ambient the valve or an associated thermostatic sensor are commonly referred to as zone valves. Such valves can be employed to control the flow of heated or cooled liquid through radiators or the like. There is an increasing trend toward the usage of zone control valves, particularly in apartments and motels, as well as in homes where single point thermostatic control of multiple heating units cannot satisfactorily correlate operation of those heating units with the varying temperatures in multiple rooms.

Recently, attempts have been made to use the fluid circulating systems required to heat living quarters in the winter in a second capacity—as a circulating system for cooled liquid during the summer (for air conditioning). It has been found, however, that many thermostatically actuable fluid control valves are not adapted for use in both types of systems. A system which would require all of its valves to be removed and different valves inserted each time the seasons changed is most undesirable. By arranging the valves so as to be electrically controlled, such as by a wall thermostat, it is possible to utilize such a valve in any desired capacity by a slight adjustment to the thermostat.

It is, therefore, an object of this invention to provide a zone valve operable by an eelctrical heating element, the operation of which is controlled by a remotely positioned thermostat.

It is a further object to provide an electrically controlled zone valve having a set of contacts in its own circuit to control operation of the valve.

It is a further object to provide an electrically controlled zone valve having an auxiliary set of contacts controlled by operation of the valve for operation of a blower motor or the like.

It is a further object to provide a zone valve of unitized construction which can be readily repaired in the event of malfunction.

It is a further object to provide a zone valve having a safety construction such that it prevents flooding if the valve should fail.

It is a further object to provide a zone valve which can be easily converted to manual operation in the event of electrical failure.

It is a further object to provide a simple and economical zone valve.

Other objects and advantages will become apparent from the disclosures taken in conjunction with the accompanying drawings in which:

FIGURE 2 is a top view of the zone valve with the cover and part of the structure cut away so as to show the electrical contacts and terminal arrangement;

FIGURE 3 is an end view of the zone valve, showing the electrical contacts;

FIGURE 4 is an exploded view (screws omitted) of the valve, partly in cross-section, showing the three basic parts of the valve. The thermally sensitive element is shown in its actuated position with the poppet open;

FIGURE 5 is a view taken along line V—V of FIG. 1, showing the fluid ports through the valve assembly; and FIGURE 6 is a schematic view of the circuitry for operating the zone valve.

Figure 1:
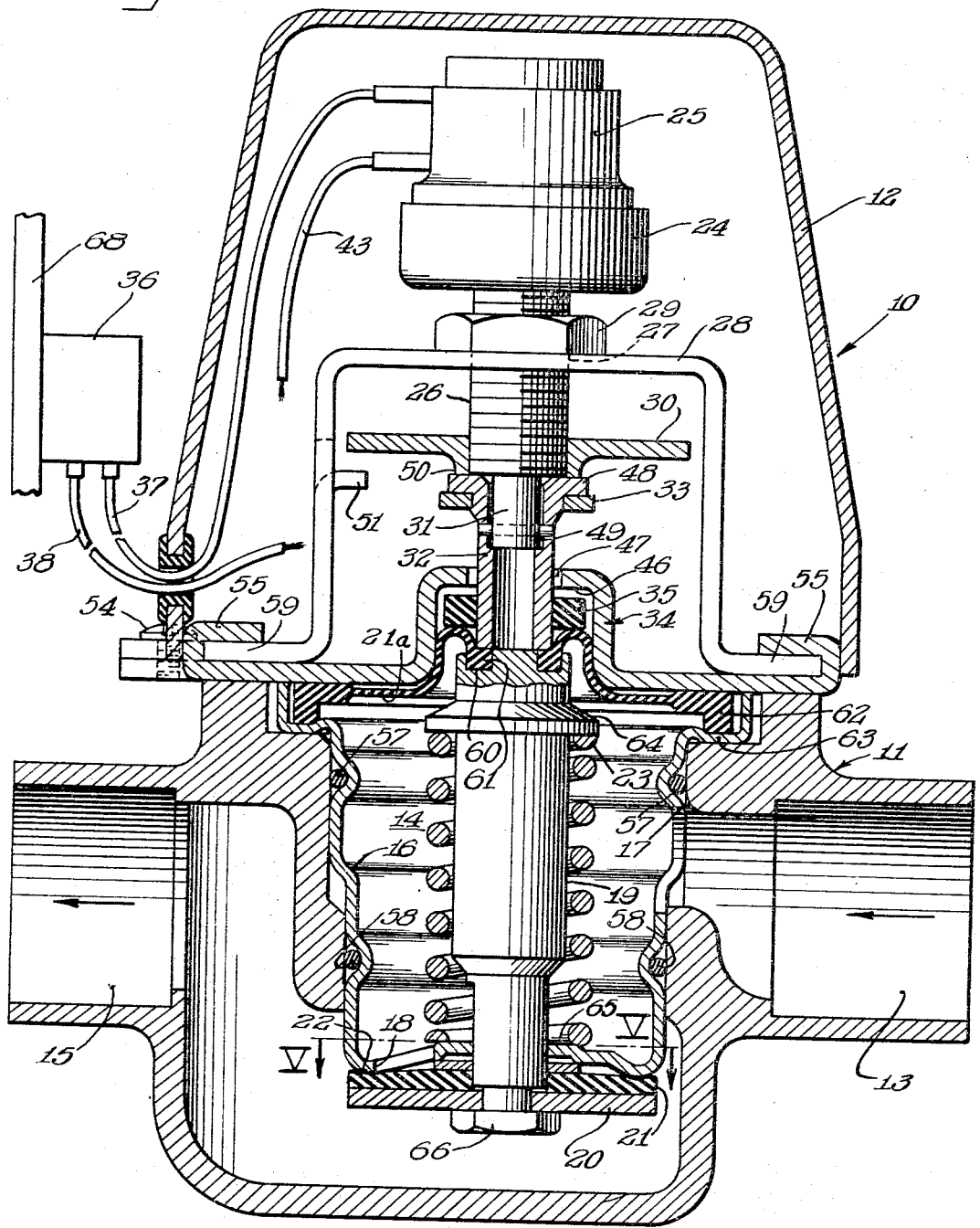
FIGURE 1 is a sectional view of the zone valve showing the valve casting, the cover, and the valve assembly including the thermally sensitive element, valve stem, and poppet.

Referring now to the drawings, the poppet valve 10 is shown including casting 11 and a cover 12. The casting 11 has an inlet 13, and an outlet 15. A metal cup 16 fits into chamber 14 and provides a substantially cylindrically shaped chamber 14, an inlet aperture 17 and a number of outlet apertures 18. Valve stem assembly 19 carries a poppet 20 (secured to stem 19 by a screw 66) at its lower end with a seal disk 21 adjacent seat 22 formed in the lower end of cup 16. One end of a spring 23 engages a shoulder 64 near the upper end of valve stem assembly 19 and the other end engages the inside bottom surface 65 of cup 16. Spring 23 thus urges poppet 20 upward so as to press seal disk 21 tightly against seat 22, and prevent flow through apertures 18. Accordingly, if valve stem 19 is pushed downward (against the pressure of spring 23) seal disk 21 is moved away from seat 22 so as to allow fluid to pass through apertures 18 into outlet 15. In FIGURE 4, seal disk 21 is shown as it appears when valve stem 19 has been pushed downward. It is noted in FIGURE 1 that a diaphragm 21a extends across the upper end of cup 19. The inner ring 60 of diaphragm 21a is held into a groove 61 in the upper end of valve stem 19 by the lower end of a sleeve 32. The outer ring 62 of diaphragm 21a is securely held between a retaining wall 34 and a horizontal wall 63 of the diametrically enlarged portion of cup 16. In this manner, a seal is provided across the top of cup 16.

Directly beneath the cover 12 of valve 10 is a thermally sensitive element 24 with an electrical heating assembly 25 mounted at its upper end. Element 24 has a threaded portion 26 which extends through a threaded hole 27 in support channel 28. Nut 29 is tightened against support channel 28 to securely mount element 24 to support channel 28 and also to permit initial adjustment of element 24 relative to support channel 28. Threaded portion 26 carries a threaded wheel 30 near its lower end. Piston 31 extends from the end of threaded portion 26 and is shown in FIGURE 1 in its most retracted position. The sleeve 32 is substantially cylindrically shaped, having a lip 48 at its upper end. Directly beneath lip 48, sleeve 32 carries an insulator 33. The upper surface of lip 48 abuts both the lower end of threaded portion 26 and the friction ring 50 of threaded portion 26. A recess 49 within sleeve 32 receives the end of piston 31. Neither piston 31, threaded portion 26, or friction ring 50 are mechanically fastened to sleeve 32 or lip 48.

Extensible movement of piston 31 from the body of the element 24 is effected by energizing the heater assembly 25 which envelopes the temperature sensing portion of the element 24. Electrical potential is applied to heating assembly 25 from the secondary of a transformer T (FIG. 6) under the control of a wall thermostat 36. As shown schematically in FIGURE 6, switch 40, 41 is normally closed so that a circuit is completed between the thermostat 36 and the heater assembly 25. It will be observed that extensible movement of the element piston acts through member 33 to open the switch 40, 41 and thereby deenergizes the heater assembly 25 and initiates retractible movement of the element piston. Auxiliary terminals 66, 67 are provided for connection to switch contacts 44, 45, respectively. Switch 44, 45 can be used to control any desired type of auxiliary circuit such as a blower fan, circulatory pump, or the like and is a normally open switch.

If it is desired to operate valve 10 manually, cover 12 can be removed and threaded wheel 30 manually rotated until friction ring 50 pushes lip 48 (and sleeve 32) downward to move poppet 20 and seal disk 21 away from seat 22 and allow fluid to flow through apertures 18. When the outer edge of wheel 30 strikes stop 51 which extends from the wall of channel 28, valve 10 is fully opened. If normal operation is later desired, wheel 30 should be manually returned to its former position.

Manual operation is primarily for emergency use or when electrical failure occurs. It can also be used when temporary service is desired without use of the thermostat as is done during installation when building heat is required but the valves are not hooked up electrically.

The lower end of sleeve 32 protrudes through retainer wall 34 and rests against the upper end of valve stem 19. Notice in FIGURE 2 that retainer wall 34 extends completely across the top of valve casting 11 and is secured to casting 11 by four screws 53. A safety washer 35 (shown in FIGURE 1) is mounted on sleeve 32 adjacent lip 46 of retainer wall 34. This safety washer 35 is positioned on sleeve 32 so that in the event diaphragm 21a bursts, safety washer 35 will be forced upward against lip 46 and squeezed into cylindrically shaped slot 47 by the fluid pressure within chamber 14. In this manner, the fluid is substantially retained within chamber 14 if diaphragm 21a bursts. Severe flooding is thereby prevented if the valve 10 fails. Any fluid which does escape may serve as a warning for valve service.

It is noted in FIGURE 1 that support member 28 has two legs 59 which are formed so as to lie against retainer wall 34. The edge 55 of retainer wall 34 has been turned up and crimped over these legs 59 so as to secure member 28 to retainer wall 34. As previously mentioned, retainer wall 34 is secured to valve body 11 by four screws 53. For repair of this valve in the field, a service man may merely remove cover 12 (by removing two screws 54) then remove retainer wall 34 from valve casting 11 by removing four screws 53. Notice that cup 16 is mounted to retainer wall 34 by means of lugs 56 which extend through retainer wall 34 and are swaged slightly. It is further observed that cup 16 is removably received within valve casting 11 and that seal rings 57 and 58 prevent leakage of fluid between cup 16 and casting 11. It will be appreciated, therefore, that when screws 53 are removed, removal of retainer wall 34 will also bring with it cup 16 and the complete valve assembly 52 shown in FIGURE 4. Thus for the moment, the service man has before him only three body parts, namely; cover 12, valve casting 11, and the complete valve assembly 52. Therefore, it is a relatively simple operation, in case service is required in the field, for a factory calibrated valve assembly to be installed in an existing valve casting 11. This construction may also be highly advantageous at the initial installation of valve 10—when inlet 13 and outlet 14 are being soldered into a fluid line. In this instance, it may be desirable to remove the complete valve assembly 52 from valve casting 11 to prevent damage to the assembly due to high temperature, sudden impacts, or the like.

Operation of the instant embodiment of this invention is as follows: Valve 10 is placed in a fluid line whose flow is to be controlled—either near the entrance to a heating radiator or the like or in the boiler room, etc. Thermostat 36 is placed on a wall 68, in a zone to be under thermostatic control to control operation of the valve as a function of the temperature within that zone. When valve 10 is closed, poppet 20 urges seal disk 21 against seat 22 to prevent fluid from passing through apertures 18. Thermostat 36 is calibrated to effect energization of heater 25 at any particular predetermined temperature— for example 69°. It is noted that contacts 40 and 41 are normally closed, therefore, when thermostat contacts are closed, heater 25 is energized. As heater 25 warms, the temperature of thermally sensitive element 24 rises, causing piston 31 to move downward, carrying sleeve 32 downward. The lower end of sleeve 32 rests against the upper end of valve stem 19. Therefore the downward movement of sleeve 32 is imparted to valve stem 19. As valve stem 19 is pushed downward (against the pressure of spring 23) poppet 20 and seal disk 21 are moved downward from seat 22 as shown in FIGURE 4. This allows fluid to flow through aperture 18 to outlet 15.

As sleeve 32 moves downward, it is seen in FIGURE 3 that insulator 33 will strike contacts 41 and 45 which extend into the path of insulator 33. As previously described, contacts 40 and 41 are in the circuit to heater 25, therefore, when that circuit is broken, heater 25 is deenergized and piston 31 is slowly returned to its retracted position by spring 23.

The cycle will be repeated when thermostat 36 again reaches 69° its contacts are closed.

It should be pointed out, of course, that the foregoing description is for a single embodiment of the instant invention and that contacts 40 and 41 may be normally open if desired in a particular installation. It is likewise possible to arrange contacts 44 and 45 in a normally closed position.

It will be appreciated that the zone valve of the instant invention can be used in locations near power equipment or the like, where it is essential that flooding be avoided. The safety washer 35 insures that only slight leakage will occur and this leakage will serve as a timely warning so that repairs can be made in due course. In addition, this valve can be easily operated in case of an electrical failure. Only cover 12 of the valve need be removed for access to the finger wheel 30. In this manner, the valve may be operated only moments after an electrical failure. Furthermore, the valve of the instant invention has been constructed to facilitate initial installation of the valve as well as field service while the valve is in use. This is accomplished by the provision of a unitized assembly of the inner parts of the valve. As previously described, this construction allows the valve to be rapidly separated into its three basic parts. A service man has only to install a complete factory calibrated assembly in the existing valve casting 11.

While I have described the above principles of my invention in connection with a specific embodiment, it is to be clearly understood that this description is made only by way of example and not as a limitation to the scope and spirit of my invention as hereinafter claimed.

I claim as my invention:

1. A fluid control comprising:
    (a) a valve body having a fluid pressure chamber and an actuation chamber,
    (b) said fluid pressure chamber having an inlet and an outlet,
    (c) valve means operably disposed within said valve body for controlling the flow of fluid from said inlet to said outlet,
    (d) a resilient diaphragm sealably attached between said valve means and said valve body and restraining fluid pressure from entering said actuation chamber,
    (e) a thermal power unit mounted within said actuation chamber and operably connected to said valve means for opening said valve means in response to a temperature rise within said power unit,
    (f) a retaining wall sealably mounted to the valve body and overlying said resilient diaphragm within the actuation chamber,
    (g) said retaining wall having a central opening,
    (h) said valve means extending loosely through said central opening,
    (i) a seal ring disposed about the valve means between the diaphragm and the retainer wall in the vicinity of said central opening,
    (j) said seal ring being normally inoperative for sealing the central opening and being forced into a sealing position at said opening by fluid pressure exposed thereagainst upon rupture of said diaphragm, (k) biasing means operably mounted within said valve body for returning said valve means to a closed position upon a temperature decline within said power unit.

2. In a fluid control valve:
(a) a thermally responsive element having a threaded housing, and having an operating plunger extending from one end of said housing,
(b) a heater adjacent said thermally responsive element,
(c) a support, said threaded housing adjustably received in said support,
(d) a finger wheel adjustably carried on said threaded housing below said support,
(e) a sleeve having a recess in a first end thereof, said operating plunger extending into said recess, whereby downward movement of said operating plunger moves said sleeve relative to said support, said sleeve having a lip at said first end,
(f) a valve body including an inlet and an outlet and a chamber communicating said inlet and outlet,
(g) a buffer plate mounted on said valve body having an aperture therein, a second end of said sleeve extending through said aperture,
(h) a cup-shaped insert within said chamber, said insert having an open upper end and an inclosed bottom, said insert having a diametrically enlarged portion near said open end, said diametrically enlarged portion comprising a horizontal wall and a vertical wall, said vertical wall of said insert being secured to said buffer plate, said insert having a plurality of ports in said bottom, and a seat around the periphery of said bottom, said insert having a port therein in alignment with said inlet in said valve body, said bottom of said insert having an aperture therein,
(i) said support being mounted on said buffer plate, whereby said support, buffer plate, and insert are a single unit assembly when said buffer plate is removed from said valve body,
(j) a valve stem, the upper end of said valve stem abutting said second end of said sleeve, the lower end of said valve stem extending through said aperture in said bottom of said insert,
(k) a poppet secured to the lower end of said valve stem,
(l) a spring encircling said valve stem and urging said valve stem against said second end of said sleeve, whereby said poppet is urged against said seat by said spring to close said ports in said bottom of said insert,
(m) a substantially circular diaphragm of flexible material having an inner ring and an outer ring, said outer ring secured between said horizontal wall of said insert and said buffer plate, said inner ring of said diaphragm secured between said valve stem and said sleeve, whereby said diaphragm forms a fluid retaining cover for said open end of said insert,
(n) a plurality of seal rings between said insert and said valve body to prevent flow of fluid therebetween,
(o) a washer slidably mounted on said second end of said sleeve immediately below said buffer plate, said washer being formed of resilient material, whereby upon rupture of said diaphragm, said washer is forced upward along said sleeve, against said buffer plate, and between said sleeve and said buffer plate to prevent fluid from flowing between said sleeve and said buffer plate.

3. In a fluid control valve:
(a) a thermally responsive element having a threaded housing, and having an operating plunger extending from one end of said housing,
(b) a heater adjacent said thermally responsive element,
(c) a support, said threaded housing adjustably received in said support,
(d) a sleeve having a recess in a first end thereof, said operating plunger extending into said recess, whereby downward movement of said operating plunger moves said sleeve relative to said support, said sleeve having a lip at said first end,
(e) a valve body including an inlet and an outlet and a chamber communicating said inlet and outlet,
(f) a buffer plate mounted on said valve body having an aperture therein, a second end of said sleeve extending through said aperture,
(g) a cup shaped insert within said chamber, said insert having an upper end and an enclosed bottom, said insert having a diametrically enlarged portion near said open end, said diametrically enlarged portion comprising a horizontal wall and a vertical wall, said vertical wall of said enlarged portion being secured to buffer plate, said cup having a plurality of ports in said bottom, and a seat formed around the periphery, said cup having a port therein in alignment with said inlet in said valve body, said bottom of said insert having an aperture therein,
(h) a valve stem, the upper end of said valve stem abutting said second end of said sleeve, the lower end of said valve stem extending through said aperture in said bottom of said insert,
(i) a poppet secured to said lower end of said valve stem,
(j) a spring encircling said valve stem and urging said valve stem against said second end of said sleeve, whereby said poppet is urged against said seat by said spring to close said ports in said bottom of said insert,
(k) a substantially circular diaphragm of flexible material having an inner ring and an outer ring, said outer ring secured between said horizontal wall of said insert and said buffer plate, said inner ring of said diaphragm secured between said valve stem and said sleeve, whereby said diaphragm forms a fluid retaining cover for said open end of said insert.

4. In a fluid control valve:
(a) a thermally responsive element having a threaded housing, and having an operating plunger extending from one end of said housing,
(b) a heater adjacent said thermally responsive element,
(c) a support, said threaded housing adjustably received in said support,
(d) a sleeve having a recess in a first end thereof, said operating plunger extending into said recess, whereby downward movement of said operating plunger moves said sleeve relative to said support, said sleeve having a lip at said first end,
(e) a valve body including an inlet and an outlet and a chamber communicating said inlet and outlet,
(f) a buffer plate mounted on said valve body having an aperture therein, a second end of said sleeve extending through said aperture,
(g) a cup-shaped insert within said chamber, said insert having an open upper end and enclosed bottom, said insert having a diametrically enlarged portion near said open end, said diametrically enlarged portion comprising a horizontal wall and a vertical wall, said vertical wall of said insert being secured to said buffer plate, said insert having a plurality of ports in said bottom, and a seat formed around the periphery of said bottom, said insert having a port therein in alignment with said inlet in said valve body, said bottom of said insert having an aperture therein,
(h) said support being mounted on said buffer plate, whereby said support, buffer plate, and insert are a single unit assembly when said buffer plate is removed from said valve body.

5. In a fluid control valve:
(a) a valve body including an inlet and an outlet and a chamber communicating said inlet and outlet,
(b) a sleeve extending into said valve body,
(c) a buffer plate mounted on said valve body and having an aperture therein, one end of said sleeve extending through said aperture,
(d) a cup-shaped insert within said chamber, said insert having an open upper end and an aperture in the lower end thereof, said insert having a diametrically enlarged portion near said open end, said diametrically enlarged portion comprising a horizontal wall and a vertical wall, said vertical wall of said insert being secured to said buffer plate,
(e) a valve stem, the upper end of said valve stem abutting the other end of said sleeve, the lower end of said valve stem extending through said aperture in the lower end of said insert,
(f) a substantially circular diaphragm of flexible material having an inner ring and an outer ring, said outer ring secured between said horizontal wall of said insert and said buffer plate, said inner ring of said diaphragm secured between said valve stem and said sleeve, whereby said diaphragm forms a fluid retaining cover for said open end of said insert,
(g) a washer carried by said second end of said sleeve immediately below said buffer plate, said washer being formed of resilient material, whereby upon rupture of said diaphragm said washer is forced upward along said sleeve against said buffer plate, and between said sleeve and said buffer plate to prevent fluid from flowing in between said sleeve and said buffer plate.

6. In a fluid control valve
(a) a thermally responsive element having a threaded housing, and having an operating plunger extending from one end of said housing,
(b) a heater adjacent said thermally responsive element,
(c) a support, said threaded housing adjustably received in said support,
(d) a finger wheel adjustably carried on said threaded housing below said support,
(e) a sleeve having a recess in a first end thereof, said operating plunger extending into said recess, whereby downward movement of said operating plunger moves said sleeve relative to said support, said sleeve having a lip at said first end, said finger wheel having a friction ring on its lower surface thereof positioned for engagement with said lip on said first end of said sleeve upon downward adjustment of said finger wheel relative to said threaded housing, whereby said sleeve may be moved downward by said finger wheel,
(f) a valve body including an inlet and an outlet and a chamber communicating said inlet and outlet,
(g) a buffer plate mounted on said valve body having an aperture therein, a second end of said sleeve extending through said aperture,
(h) a cup-shaped insert within said chamber, said insert having an open upper end and an enclosed bottom, said insert having a diametrically enlarged portion near said open end, said diametrically enlarged portion comprising a horizontal wall and a vertical wall, said vertical wall of said enlarged portion being secured to said buffer plate, said insert having a plurality of ports in said bottom, and a seat formed around the periphery of said bottom, said insert having a hole therein in alignment with said inlet in said valve body, said bottom of said insert having an aperture therein,
(i) said support being mounted on said buffer plate, whereby said support, buffer plate, and insert are a single unit assembly when said buffer plate is removed from said valve body,
(j) a valve stem, the upper end of said valve stem abutting said second end of said sleeve, the lower end of said valve stem extending through said aperture in said bottom of said insert,
(k) a poppet secured to said lower end of said valve stem,
(l) a spring encircling said valve stem and urging said valve stem against said lower end of said sleeve, whereby said poppet is urged against said sleeve by said spring to close said ports in said bottom of said insert.

References Cited
UNITED STATES PATENTS

| | | | |
|---|---|---|---|
| 1,292,396 | 1/1919 | Gold | 251—11 |
| 1,323,456 | 12/1919 | Decker | 251—11 X |
| 1,800,995 | 5/1931 | Gaunt et al. | 251—335 X |
| 2,055,133 | 9/1936 | Newell | 251—11 |
| 2,676,610 | 4/1954 | Hare | 137—454.6 |
| 2,754,840 | 7/1956 | Hicks | 137—454.6 |
| 2,826,215 | 3/1958 | Wolfslau et al. | 137—454.6 |
| 3,140,852 | 7/1964 | Herzog | 251—11 |
| 3,164,365 | 1/1965 | White et al. | 251—335 |

M. CARY NELSON, *Primary Examiner.*

E. FEIN, *Assistant Examiner.*